United States Patent
Tsuchida et al.

(10) Patent No.: US 11,989,087 B2
(45) Date of Patent: May 21, 2024

(54) TAG READING APPARATUS AND TAG READING CONTROL METHOD

(71) Applicant: TOSHIBA TEC KABUSHIKI KAISHA, Tokyo (JP)

(72) Inventors: Sunao Tsuchida, Mishima Shizuoka (JP); Sadatoshi Oishi, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 57 days.

(21) Appl. No.: 17/748,744

(22) Filed: May 19, 2022

(65) Prior Publication Data
US 2023/0018731 A1   Jan. 19, 2023

(30) Foreign Application Priority Data
Jul. 13, 2021   (JP) .................................. 2021-115533

(51) Int. Cl.
*G06F 11/10*   (2006.01)
*G06F 11/07*   (2006.01)
*G06K 7/00*    (2006.01)
*G06K 7/10*    (2006.01)

(52) U.S. Cl.
CPC ...... *G06F 11/1004* (2013.01); *G06F 11/0706* (2013.01); *G06K 7/0008* (2013.01); *G06K 7/10039* (2013.01)

(58) Field of Classification Search
CPC ............. G06F 11/0706; G06F 11/1004; G06K 7/0008; G06K 7/10009
See application file for complete search history.

(56) References Cited

U.S. PATENT DOCUMENTS

| | | | | |
|---|---|---|---|---|
| 5,692,009 A | * | 11/1997 | Iijima ..................... | H04L 1/205 324/76.77 |
| 2005/0041706 A1 | * | 2/2005 | Magoon ............... | H04B 10/503 372/38.01 |
| 2005/0197738 A1 | * | 9/2005 | Morrison ................. | G01C 9/00 700/231 |
| 2006/0108411 A1 | * | 5/2006 | Macurek ................ | F04B 43/08 235/375 |
| 2008/0024281 A1 | * | 1/2008 | Shimura ............ | G06K 7/10039 340/10.3 |
| 2008/0197982 A1 | * | 8/2008 | Sadr .................... | G06K 7/10366 375/340 |
| 2012/0068831 A1 | * | 3/2012 | Shimura .................. | G06K 5/00 340/10.52 |

(Continued)

FOREIGN PATENT DOCUMENTS

| | | | | | |
|---|---|---|---|---|---|
| CN | 110348258 A | * | 10/2019 | | |
| JP | 2008193576 A | * | 8/2008 | | |
| WO | WO-2011009768 A2 | * | 1/2011 | ........... | G06K 7/0008 |

*Primary Examiner* — April Y Blair
*Assistant Examiner* — Enamul M Kabir
(74) *Attorney, Agent, or Firm* — Kim & Stewart LLP

(57) ABSTRACT

According to an embodiment, a tag reading apparatus acquires tag data of a wireless tag to be learned without transmission from the wireless tag to be learned. The tag reading apparatus extracts a data signal from a reception signal output from an antenna that has received a radio wave from the wireless tag to be learned. The tag reading apparatus learns the extracted data signal in association with correct answer data of the wireless tag to be learned.

10 Claims, 6 Drawing Sheets

(56) References Cited

U.S. PATENT DOCUMENTS

| | | | | |
|---|---|---|---|---|
| 2012/0146771 A1* | 6/2012 | Shimura | ............ | G06K 7/10297 |
| | | | | 340/10.4 |
| 2017/0286730 A1* | 10/2017 | Sadr | ................... | G06K 7/10099 |
| 2019/0294625 A1* | 9/2019 | Bentz | ................... | G06K 7/1417 |
| 2019/0324444 A1* | 10/2019 | Cella | ................... | G05B 19/4183 |
| 2021/0027616 A1* | 1/2021 | Shakedd | ............ | G06Q 30/0185 |

\* cited by examiner

TAG READING APPARATUS AND TAG READING CONTROL METHOD

CROSS-REFERENCE TO RELATED APPLICATIONS

This application is based upon and claims the benefit of priority from the prior Japanese Patent Application No. 2021-115533, filed on Jul. 13, 2021, the entire contents of which are incorporated herein by reference.

FIELD

An embodiment to be described here generally relates to a tag reading apparatus and a tag reading control method.

BACKGROUND

A wireless tag backscatters the radio wave emitted from an antenna of a tag reading apparatus and wirelessly transmits a data signal in which tag data has been encoded at a predetermined encoding speed. At the head of the tag data, a preamble part for generating a clock signal having a frequency corresponding to the encoding speed is provided. The tag reading apparatus decodes the tag data from the data signal at the timing corresponding to the clock signal generated in synchronization with the preamble part included in the received data signal. However, there is a possibility that the encoding speed in the wireless tag varies during one data transmission period due to the decrease in accuracy along with the price reduction of wireless tags. If this variation becomes large, there has been a possibility that the tag data cannot be correctly decoded by the clock signal generated in accordance with the preamble part. Under such circumstances, it has been desired to increase the possibility that tag data can be correctly decoded even if the encoding speed varies in the wireless tag.

DETAILED DESCRIPTION

According to an embodiment, a tag reading apparatus reads tag data from a wireless tag. The tag reading apparatus includes an antenna, an extraction device, and a processor. The antenna emits a radio wave to start reding the tag data, receives a radio wave emitted from the wireless tag, and outputs a reception signal. The extraction device extracts, from the reception signal, a data signal in which the tag data has been encoded. The processor receives designation of a wireless tag to be learned. The processor acquires tag data of the wireless tag to be learned without receiving, by the antenna, a radio wave from the wireless tag to be learned, and generates, on a basis of the acquired tag data, correct answer data of the wireless tag to be learned. The processor causes the antenna to emit a radio wave for starting reading the tag data of the wireless tag to be learned to start reading the tag data of the wireless tag to be learned. The processor learns the data signal extracted by the extraction device from the reception signal output by the antenna that has received the radio wave from the wireless tag to be learned, in association with the correct answer data of the wireless tag to be learned. The processor causes the antenna to emit a radio wave for starting reading tag data of a wireless tag to be read to start reading the tag data of the wireless tag to be read. Further, the processor determines, on a basis of a result of the learning, the tag data included in the data signal extracted by the extraction device from the reception signal output by the antenna that has received the radio wave from the wireless tag to be read.

Figure 1:
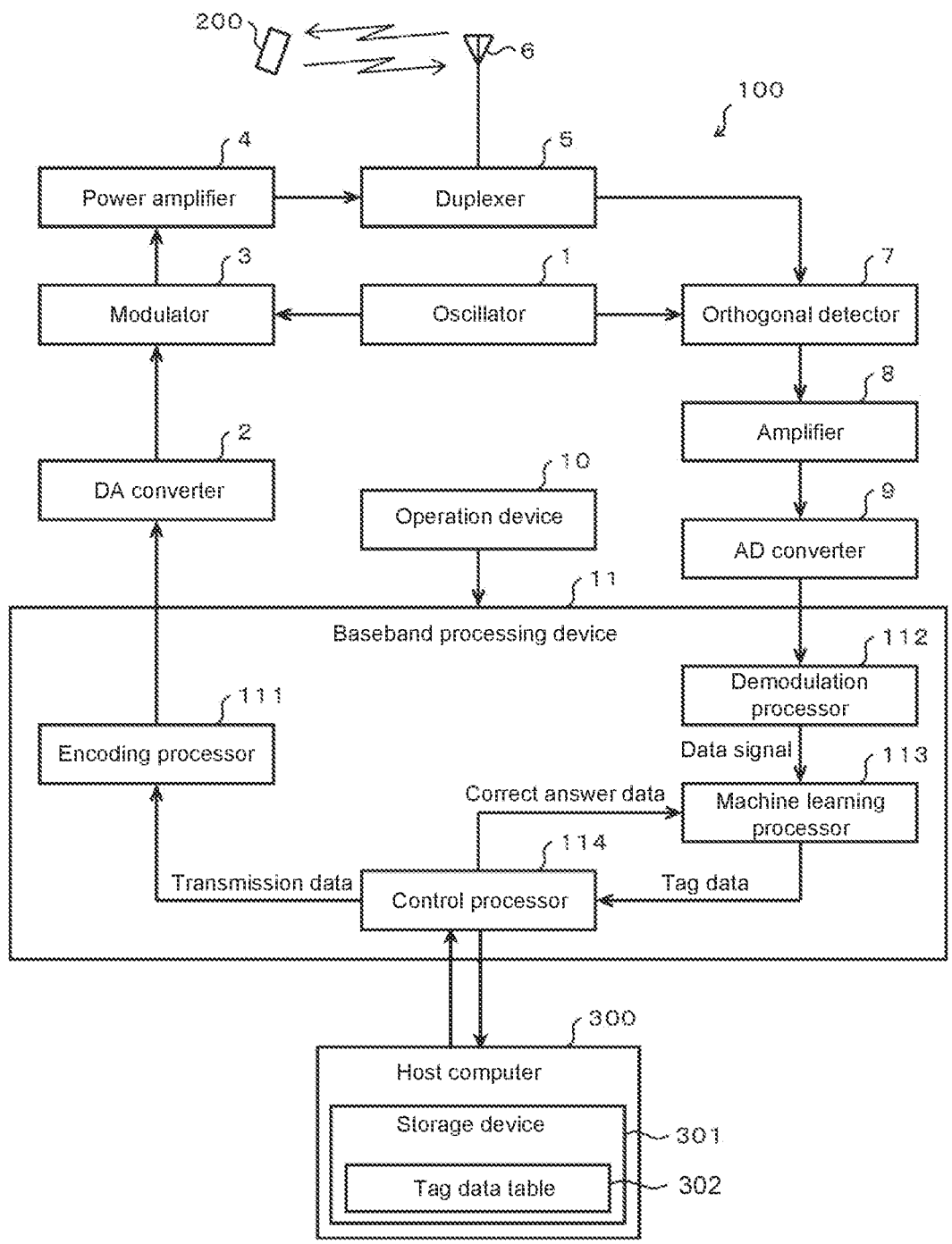
FIG. 1 is a block diagram showing a main circuit configuration of a tag reading apparatus according to an embodiment.

An embodiment will be described below with reference to the drawings. In the drawings, the same reference symbols indicate the same or similar portions. Note that in the following, a tag reading apparatus that reads data from a wireless tag will be described as an example. Note that since the wireless tag is widely referred to also as an RFID (radio frequency identification) tag, the wireless tag will be referred to as the RFID tag below. FIG. 1 is a block diagram showing a main circuit configuration of a tag reading apparatus 100 according to an embodiment.

The tag reading apparatus 100 includes an oscillator 1, a DA (digital to analog) converter 2, a modulator 3, a power amplifier 4, a duplexer 5, an antenna 6, an orthogonal detector 7, an amplifier 8, an AD (analog to digital) converter 9, an operation device 10, and a baseband processing device 11. Note that the antenna 6 does not necessarily need to be included in the tag reading apparatus 100 and may be externally attached to the tag reading apparatus 100.

The oscillator 1 generates, as a carrier wave, a sine wave and a cosine wave having a predetermined frequency. The DA converter 2 converts a data signal for transmission output from the baseband processing device 11 in a digital state into an analog signal. The modulator 3 uses, as a modulation wave, the analog data signal converted by the DA converter 2 and modulates the carrier wave generated by the oscillator 1 to obtain a transmission signal. The power amplifier 4 power-amplifies the transmission signal output from the modulator 3 to a level suitable for wireless transmission.

The duplexer 5 includes an input terminal, an input/output terminal, and an output terminal. The power amplifier 4 is connected to the input terminal of the duplexer 5. The antenna 6 is connected to the input/output terminal of the duplexer 5. The orthogonal detector 7 is connected to the output terminal of the duplexer 5. When the transmission signal amplified by the power amplifier 4 is input to the input terminal, the duplexer 5 supplies this transmission signal from the input/output terminal to the antenna 6. The duplexer 5 inputs, from the input/output terminal, the reception signal output from the antenna 6, and outputs the reception signal from the output terminal.

The antenna 6 emits a radio wave corresponding to the transmission signal supplied from the duplexer 5. The antenna 6 generates, as a reception signal, an electrical signal according to the incoming radio wave transmitted from an RFID tag 200. Note that the reception signal generated by the antenna 6 in accordance with the incoming radio wave transmitted from the RFID tag 200 is a signal modulated by a data signal (data signal corresponding to tag data) obtained by backscattering the radio wave emitted from the antenna 6 and encoding tag data by the RFID tag 200. For the encoding described above, for example, an RZ (return to zero) code is used.

The orthogonal detector 7 performs orthogonal detection of the reception signal output from the output terminal of the duplexer 5 using the carrier wave generated by the oscillator 1. The orthogonal detector 7 outputs the data signal in an analog state obtained by the orthogonal detection. The amplifier 8 amplifies the data signal output from the orthogonal detector 7 to a level suitable for digitization by the AD converter 9. The amplifier 8 cuts off a DC component through a capacitor prior to the amplification in order to prevent saturation due to the influence of the DC component. The AD converter 9 digitizes the data signal after being amplified by the amplifier 8.

The operation device 10 is a user interface for an operator to operate the tag reading apparatus 100. The operation device 10 includes at least an operation unit for inputting various instructions by the operator. The operation unit may be a well-known unit such as a touch panel. The operation device 10 may include, for example, a display device for displaying various types of information to the operator. The display device may be a well-known device such as a liquid crystal display. However, the operation of the tag reading apparatus 100 may be performed by a host computer 300 described below, and the tag reading apparatus 100 does not necessarily need to include the operation device 10.

The baseband processing device 11 includes an encoding processor 111, a demodulation processor 112, a machine learning processor 113, and a control processor 114. The encoding processor 111 obtains a data signal for transmission by encoding, by a predetermined encoding method, transmission data output from the control processor 114 for transmission to the RFID tag 200, and outputs the obtained data signal to the DA converter 2. The demodulation processor 112 generates a data signal having a waveform according to the original RZ code from the data signal having a differential waveform by passing through the capacitor in the amplifier 8. In this way, a data signal is extracted from the radio signal received by the antenna 6 by a series of processes by the orthogonal detector 7, the amplifier 8, the AD converter 9, and the demodulation processor 112. The function as an extraction unit of a data signal is realized by cooperation of the orthogonal detector 7, the amplifier 8, the AD converter 9, and the demodulation processor 112.

The machine learning processor 113 has a learning mode and a decoding mode as operation modes. The machine learning processor 113 decodes, in the decoding mode, tag data from the data signal fed by the demodulation processor 112, on the basis of the learning result in the learning mode. The control processor 114 feeds transmission data to the encoding processor 111 in accordance with a predetermined sequence when communicating with the RFID tag 200. The control processor 114 takes in the tag data output by the machine learning processor 113 as tag data transmitted from the RFID tag 200 in accordance with a predetermined sequence. The control processor 114 performs predetermined processing on the taken tag data. The processing is, for example, processing for displaying a screen showing the reading result on the basis of the tag data on the operation device 10. Alternatively, the processing is, for example, processing for notifying the host computer 300 of the taken tag data or part of the data.

The host computer 300 is an information processing apparatus that is connected to the tag reading apparatus 100 and used as a user interface for controlling the tag reading apparatus 100 or checking the reading result by the tag reading apparatus 100. In this embodiment, the host computer 300 includes a storage device 301. The storage device 301 stores a tag data table 302.

Figure 2:
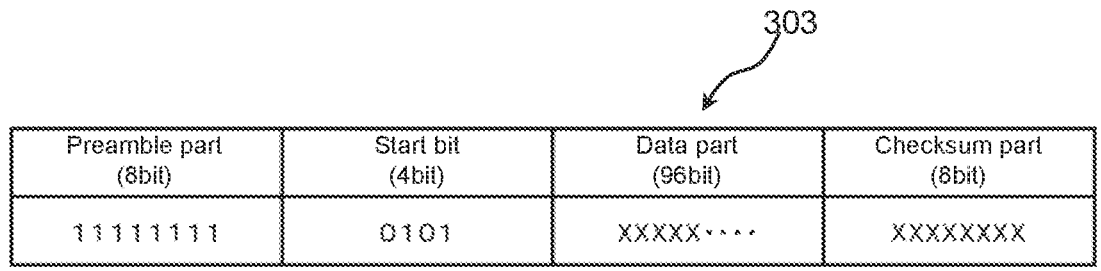
FIG. 2 is a diagram showing an example of a structure of tag data according to the embodiment.

The tag data table 302 is a data table for the control processor 114 to refer to tag data transmitted by a plurality of RFID tags 200 used for learning of the machine learning processor 113. FIG. 2 is a diagram showing an example of a structure of tag data 303. The tag data 303 includes a preamble part, a start bit, a data part, and a checksum part. The preamble part and the start bit are common to all the RFID tags 200. In the data part, data individually stored by the plurality of RFID tags 200 is set. The data set in this data part is data to be read by the tag reading apparatus 100. The data set in the data part will be referred to as the actual data below. The actual data includes at least an identification code as an identifier for identifying each of the RFID tags 200. Note that the actual data often includes only an identification code. However, the actual data may include, in addition to the identification code, arbitrary data different from the identification code. In the checksum part, an error detection code calculated in accordance with a predetermined rule for the actual data is set.

Figure 3:
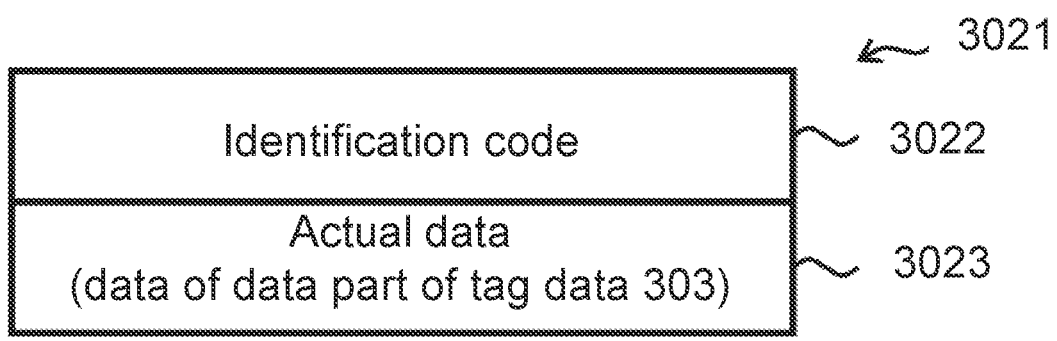
FIG. 3 is a diagram schematically showing one data structure of a data record included in a tag data table according to the embodiment.

FIG. 3 is a diagram schematically showing one data structure of a data record 3021 included in the tag data table 302. The tag data table 302 is a set of a plurality of data records 3021 associated with the plurality of respective RFID tags 200. The data record 3021 includes fields 3022 and 3023. In the field 3022, the identification code of the associated RFID tag 200 is set. In the field 3023, the actual data to be transmitted by the associate RFID tag 200 is set. Note that the field 3023 may include, in addition to the actual data set in the data part of the tag data 303, at least one of the pieces of data set in the preamble part, the start bit, and the checksum part.

Next, an operation of the above-mentioned tag reading apparatus 100 will be described. Note that most of the operations for reading the RFID tag 200 are the same as already known operations. The characteristic operation of the tag reading apparatus 100 will be mainly described now. Further, the content of various processes described below is merely an example, and the order of some processes can be changed, some processes can be omitted, or another process can be added as appropriate.

Prior to starting description of the operation of the tag reading apparatus 100, the properties of the data signal generated by the demodulation processor 112 will be described. The data signal is originally a signal obtained by encoding data at a predetermined encoding speed. Therefore, in the case of the RZ code, the data signal should be a signal in which one of a pattern in which a high level or a low level appears every ½ cycle for a bit of "1" and a pattern in which a low level appears over one cycle for a bit of "0" appears every cycle. However, in the case where the encoding speed varies due to the decrease in accuracy along with the price reduction of the RFID tag 200, or the like, the change cycle of the data signal fluctuates during one reception period of tag data.

Figure 4:
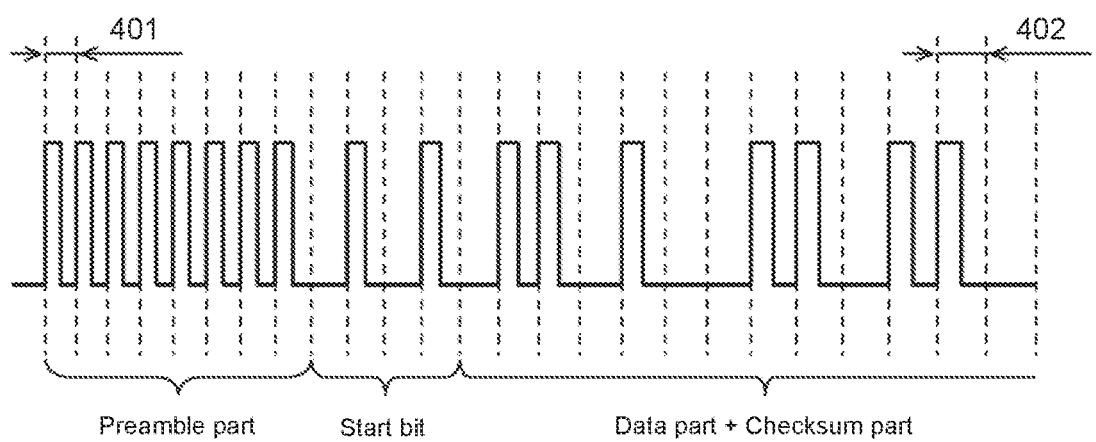
FIG. 4 is a diagram showing an example of a waveform of a data signal in the case where the encoding speed gradually slows down.

FIG. 4 is a diagram showing an example of a waveform of a data signal in the case where the encoding speed gradually slows down. In the data signal shown in FIG. 4, a period 402 of the 12th bit of the data part is longer than a period 401 of the 1st bit of the preamble part. For this reason, in the clock signal generated on the basis of the preamble part, it is difficult to correctly decode the data part and the checksum part. Further, assumption is made that even if the encoding speed during one reception period of tag data is constant, the encoding speed largely varies for each response of a tag and for each tag. If the encoding speed largely varies, the preamble part cannot be recognized as a preamble part and cannot be decoded.

The operation device 10 or the host computer 300 instructs to start learning during the preparation work for starting use of the tag reading apparatus 100 or during maintenance. Note that when starting learning, a maintenance worker prepares the plurality of RFID tags 200 for learning and adds the data records 3021 (see FIG. 3) associated with the plurality of respective RFID tags 200 for learning to the tag data table 302. Alternatively, the maintenance worker prepares, as the RFID tags 200 for learning, a plurality of RFID tags 200 associated with the data records 3021 already included in the tag data table 302.

Figure 5:
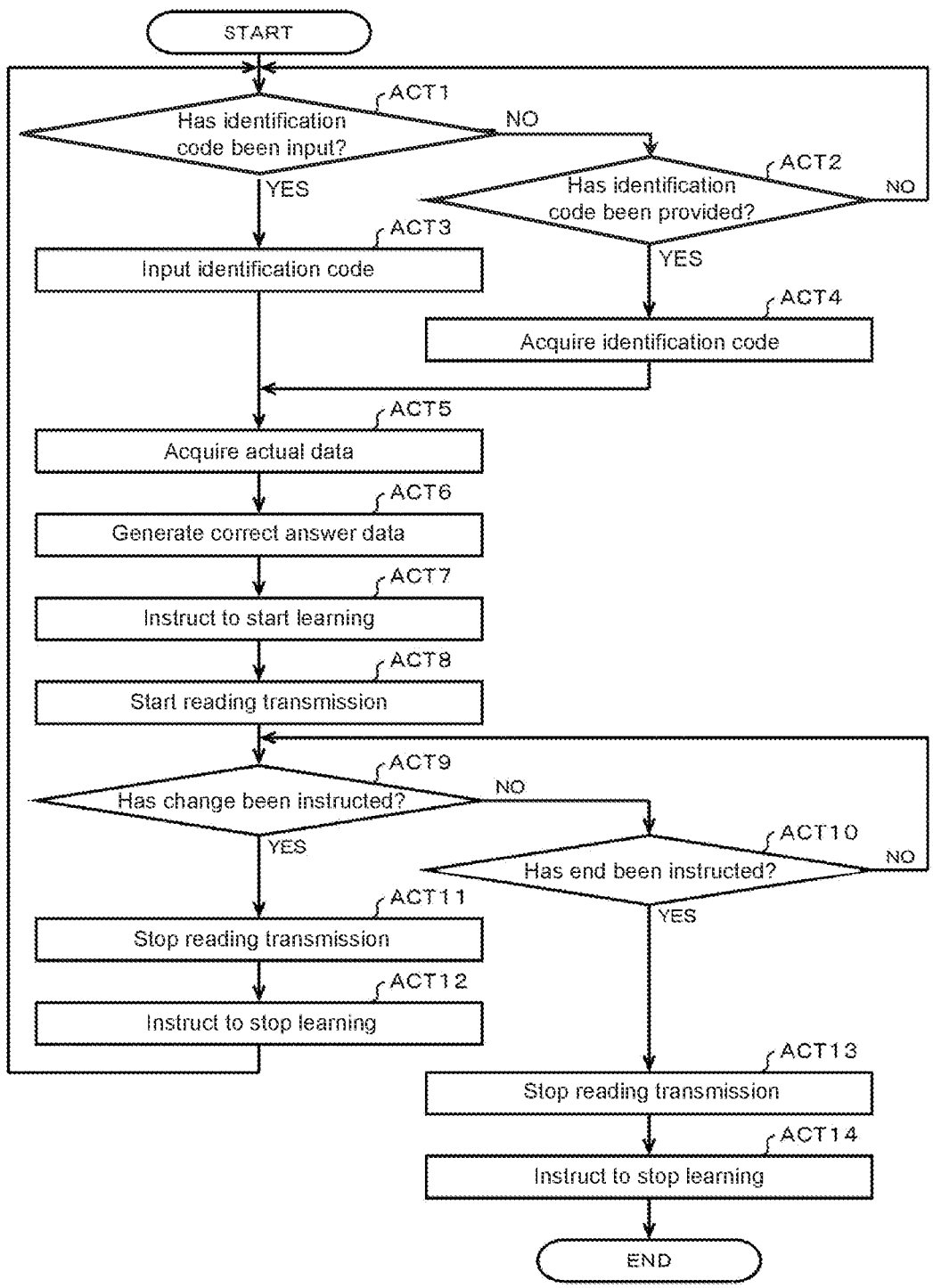
FIG. 5 is a flowchart of learning control processing by a control processor according to the embodiment.

The control processor 114 executes learning control processing when an instruction to start learning is input by the operation device 10 or the instruction is provided by the host computer 300. FIG. 5 is a flowchart of learning control processing by the control processor 114 of the baseband processing device 11.

In ACT1, the control processor 114 determines whether or not an identification code has been input by an operation received by the operation device 10. In the case where it is determined that the corresponding event cannot be confirmed (NO in ACT1), the processing of the control processor 114 proceeds to ACT2. That is, in the case where it is determined that no identification code has been input by the operation device 10, the processing of the control processor 114 proceeds to ACT2. In ACT2, the control processor 114 determines whether or not an identification code has been provided from the host computer 300. Then, in the case where it is determined that the corresponding event cannot be confirmed (NO in ACT2), the processing of the control processor 114 returns to ACT1. That is, in the case where it is determined that no identification code has been provided from the host computer 300, the processing of the control processor 114 returns to ACT1. In this way, the control processor 114 stands by until an identification code is input or the identification code is provided in ACT1 and ACT2.

The maintenance worker selects one RFID tag 200 for learning and operates the operation device 10 to input the identification code of the selected RFID tag 200. Alternatively, the maintenance worker selects one RFID tag 200 for learning and designates the RFID tag 200 for learning by the host computer 300. This designation may be performed by, for example, inputting an identification code or designing one on a screen displaying the list of the RFID tags 200 associated with the data records 3021 included in the tag data table 302.

The control processor 114 determines, when the above-mentioned operation of inputting an identification code has been performed by the operation device 10, that an identification code has been input by the operation device 10 (YES in ACT1). The processing of the control processor 114 proceeds to ACT3. In ACT3, the control processor 114 inputs an identification code on the basis of the operation by the operation device 10. Meanwhile, when an identification code has been designated as described above, the host computer 300 notifies the tag reading apparatus 100 of the designated identification code. In response to this, the control processor 114 determines that an identification mode has been provided from the host computer 300 (YES in ACT2). Then, the processing of the control processor 114 proceeds to ACT4. In ACT4, the control processor 114 acquires the identification code provided from the host computer 300. When the processing of ACT3 or ACT4 is completed, the processing of the control processor 114 proceeds to ACT5 in either case. Note that the control processor 114 may omit the processing of ACT1 and ACT3 or the processing of ACT2 and ACT4, and receive designation of an identification code by only one of the operation device 10 and the host computer 300.

In ACT5, the control processor 114 acquires the data associated with the identification code input in ACT3 or the identification code acquired in ACT4 in the tag data table 302. Specifically, for example, the control processor 114 transmits request data including the corresponding identification code to the host computer 300. Then, the host computer 300 selects, from the tag data table 302, the data record 3021 (see FIG. 3) in which the identification code included in the request data is set in the field 3022. The host computer 300 transmits, to the tag reading apparatus 100, response data including the actual data set in the field 3023 of the corresponding data record 3021. Thus, the control processor 114 acquires the actual data included in this response data. Note that the host computer 300 may provide, in addition to an identification code as described above, the actual data associated with the identification code in the tag data table 302. In this case, the control processor 114 acquires, in ACT4, the provided actual data in this way, omits the processing of ACT5, and performs the processing of ACT6. Further, in the case where the actual data includes only an identification code, the control processor 114 omits the processing of ACT5 and performs the processing of ACT6 because the identification code input in ACT3 or the identification code acquired in ACT4 is used as the actual data as it is.

In ACT6, the control processor 114 generates, as correct answer data, tag data including the data acquired in ACT5. For example, the control processor 114 calculates a checksum regarding the actual data acquired in ACT5. The control processor 114 generates correct answer data as tag data including the data of the predetermined preamble part and the start bit, in which the actual data acquired in ACT5 and the data of the calculated checksum described above are respectively set in the data part and the checksum part. For example, the control processor 114 reads the data of the preamble part and the start bit stored in a memory in advance and causes correct answer data to include them. For example, the data of the preamble part and the start bit may be stored in an arbitrary storage device such as a memory built in the control processor 114 and a memory separately provided in the baseband processing device 11. Note that the control processor 114 may cause, in the case where at least part of the data of the preamble part, the start bit, and the data of the checksum part is included in the data acquired in ACT5, correct answer data to include the data as it is. Note that the control processor 114 may adopt, for example, in the case where all of the data of the preamble part, the start bit, the actual data, and the data of the checksum are included in the fields 3023 of the data records 3021 included in the tag data table 302, the data as correct answer data as it is, and omit the above-mentioned processing of generating correct answer data. In this way, the control processor 114 has a function as an acquisition unit that acquires correct answer data corresponding to the tag data transmitted by the RFID tag 200 to be learned without transmission from the RFID tag 200 to be learned.

In ACT7, the control processor 114 instructs the machine learning processor 113 to start learning. The control processor 114 notifies the machine learning processor 113 of the correct answer data generated as described above, at the same time as this instruction or before or after the instruction. The machine learning processor 113 starts, when the start of learning has been instructed, an operation in the learning mode.

In ACT8, the control processor 114 starts reading transmission for reading tag data from the RFID tag 200 in a state of being capable of communicating with the tag reading apparatus 100. At this time, the control processor 114 outputs transmission data in a well-known sequence such that the RFID tag 200 backscatters the radio wave emitted from the antenna 6 and the RFID tag 200 generates a reflection wave modulated by the data signal corresponding to the tag data.

The maintenance worker brings the selected RFID tag 200 for learning and the antenna 6 close to each other. Then, the RFID tag 200 for learning backscatters the radio wave emitted from the antenna 6 by the reading transmission started as described above. The RFID tag 200 for learning generates a reflection wave modulated by the data signal corresponding to the tag data stored by itself. In this way, the tag data transmitted from the RFID tag 200 for learning is the same as correct answer data.

From the reception signal generated by the antenna 6 in accordance with the reflection wave from the RFID tag 200, the data signal generated by the orthogonal detector 7, the amplifier 8, the AD converter 9, and the demodulation processor 112 is input to the machine learning processor 113. In the learning mode, the machine learning processor 113 extracts a feature amount such as a fluctuation of a period for each bit of the input data signal and performs learning in association with correct answer data. The machine learning processor 113 uses, for example, a well-known machine learning model for the processing for this learning.

The maintenance worker sequentially changes the RFID tag for learning to be selected. The maintenance worker instructs to change the RFID tag for learning by a predetermined operation by the operation device 10 or the host computer 300.

When the processing of ACT8 is completed, the processing of the control processor 114 proceeds to ACT9. In ACT9, the control processor 114 determines whether or not the change of the RFID tag for learning has been instructed via the operation device 10 or the host computer 300. Then, in the case where it is determined that the corresponding event cannot be confirmed (NO in ACT9), the processing of the control processor 114 proceeds to ACT10. That is, in the case where it is determined that the change of the RFID tag for learning has not been instructed, the processing of the control processor 114 proceeds to ACT10. In ACT10, the control processor 114 determines whether or not the end of processing has been instructed via the operation device 10 or the host computer 300. Then, in the case where it is determined that the corresponding event cannot be confirmed (NO in ACT10), the processing of the control processor 114 returns to ACT9. That is, in the case where it is determined that the end of processing has not been instructed, the processing of the control processor 114 returns to ACT9. In this way, the control processor 114 stands by until the change of the RFID tag for learning or the end of processing is instructed in ACT9 and ACT10.

In the case where it is determined that the change of the RFID tag for learning has been instructed by the maintenance worker via the operation device 10 or the host computer 300 (YES in ACT9) as described above, the processing of the control processor 114 proceeds to ACT11.

In ACT11, the control processor 114 stops the reading transmission. In ACT12, the control processor 114 instructs the machine learning processor 113 to end the learning. The control processor 114 returns to the stand-by state of ACT1 and ACT2 after performing the processing of ACT12.

The maintenance worker instructs to change the RFID tag for learning as described above, and then inputs or designates the identification code of the newly selected RFID tag 200 for learning in the same manner as that described above. In response to this, the tag reading apparatus 100 performs learning by the machine learning processor 113 in the same manner as that described above.

The maintenance worker instructs, after the learning of each of the plurality of RFID tags 200 for learning is completed, to end the processing by a predetermined operation by the operation device 10 or the host computer 300.

In response to such an end instruction, the control processor 114 determines that the end of learning control processing has been instructed (YES in ACT10). Then, the processing of the control processor 114 proceeds to ACT13. In ACT13, the control processor 114 stops the reading transmission.

In ACT14, the control processor 114 instructs the machine learning processor 113 to end the learning. Then, the control processor 114 ends the learning control processing.

A reading worker who performs reading work of the RFID tag 200 using the tag reading apparatus 100 instructs to start reading by the operation device 10 or the host computer 300.

Figure 6:
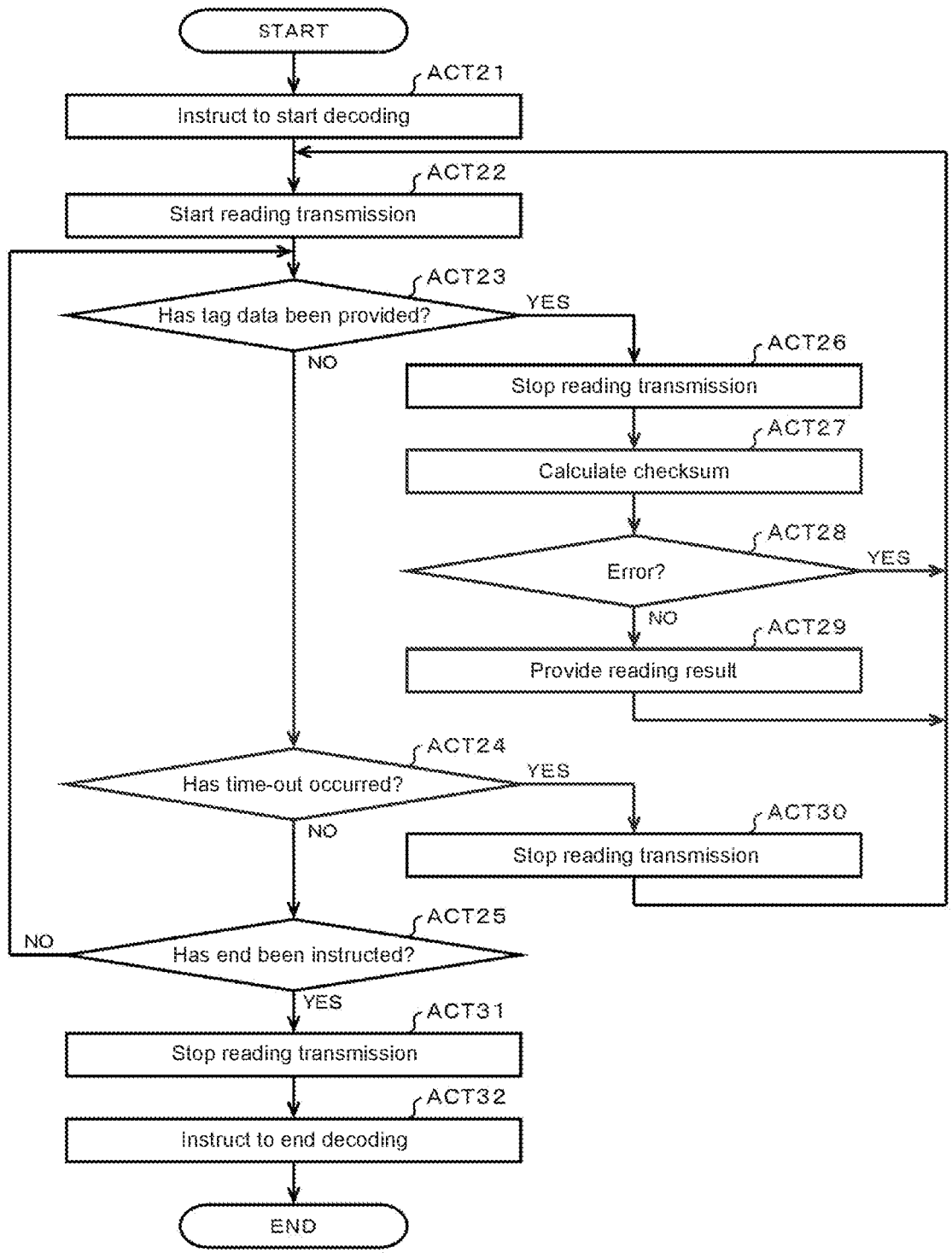
FIG. 6 is a flowchart of reading control processing by the control processor according to the embodiment.

The control processor 114 executes reading control processing when an instruction to start reading has been input by the operation device 10 or the instruction has been provided from the host computer 300. FIG. 6 is a flowchart of reading control processing by the control processor 114.

In ACT21, the control processor 114 instructs the machine learning processor 113 to start decoding. The machine learning processor 113 starts, when the start of decoding has been instructed, an operation in the decoding mode. In ACT22, the control processor 114 starts reading transmission. At this time, the control processor 114 outputs transmission data in a well-known sequence such that an unknown RFID tag 200 in a communicable state backscatters the radio wave emitted from the antenna 6 and the RFID tag 200 generates a reflection wave modulated by the data signal corresponding to the tag data.

The reading worker brings the RFID tag 200 to be read and the antenna 6 close to each other. Then, the RFID tag 200 to be read backscatters the radio wave emitted from the antenna 6 by reading transmission started as described above and generates a reflection wave modulated by the data signal corresponding to the tag data stored by itself.

From the reception signal generated by the antenna 6 in accordance with the reflection wave from the RFID tag 200, the data signal generated by the orthogonal detector 7, the amplifier 8, the AD converter 9, and the demodulation processor 112 is input to the machine learning processor 113. The machine learning processor 113 determines, in the decoding mode, the tag data included in the input data signal on the basis of the learning result in the learning mode and notifies the control processor 114 of the tag data as a decoding result.

After starting reading transmission in ACT22, the processing of the control processor 114 proceeds to ACT23. In ACT23, the control processor 114 determines whether or not tag data has been provided from the machine learning processor 113. Then, in the case where it is determined that the corresponding event cannot be confirmed (NO in ACT23), the processing of the control processor 114 proceeds to ACT24. That is, in the case where it is determined that tag data has not been provided from the machine learning processor 113, the processing of the control processor 114 proceeds to ACT24. In ACT24, the control processor 114 determines whether or not a time-out has occurred by whether or not a predetermined condition has been established. Whether or not a predetermined condition has been established represents, for example, whether or not a specified standby time has elapsed since reading transmission was started in ACT22. In the case where it is determined that the corresponding event cannot be confirmed (NO in ACT24), the processing of the control processor 114 proceeds to ACT25. That is, the control processor 114 determines, for example, in the case where the specific standby time has not elapsed, that a time-out has not occurred, and the processing of the control processor 114 proceeds to ACT25. In ACT25, the control processor 114 determines whether or not an end instruction has been made. In the case where it is determined that the corresponding event cannot be confirmed (NO in ACT25), the processing of the control processor 114 returns to ACT23. In this way, the control processor 114 stands by until one of notification of tag data, a time-out, and an end instruction occurs in ACT23 to ACT25. Then, in the case where tag data has been provided from the machine learning processor 113 as described above (YES in ACT23), the processing of the control processor 114 proceeds to ACT26.

In ACT26, the control processor 114 stops the reading transmission. In ACT27, the control processor 114 calculates a checksum regarding the data part of the provided tag data. In ACT28, the control processor 114 determines whether or not the data part of the provided tag data has an error. For example, the control processor 114 compares the checksum calculated in ACT27 and the checksum set in the checksum part of the provided tag data with each other. Then, the control processor 114 determines, in the case where the calculated checksum and the checksum of the checksum part of the provided tag data match with each other, that the data part of the provided tag data has no error (NO in ACT28). Then, the processing of the control processor 114 proceeds to ACT29. In ACT29, the control processor 114 outputs the provided tag data to the host computer 300 as a reading result. Alternatively, the control processor 114 may directly notify a reading operator of a reading result by displaying a reading result screen based on tag data on the operation device 10. Then, the processing of the control processor 114 returns to ACT22. The control processor 114 stands by for reading the next RFID tag 200 in ACT22. Note that the control processor 114 determines, for example, in the case where the checksum calculated in ACT27 and the checksum of the checksum part of the provided tag data do not match with each other, that the data part of the provided tag data has an error (YES in ACT28). The control processor 114 does not execute the processing of ACT29, and the processing of the control processor 114 returns to ACT22.

Meanwhile, the control processor 114 determines, for example, in the case where the specified standby time described above has elapsed, that a time-out has occurred (YES in ACT24). Then, the processing of the control processor 114 proceeds to ACT30. In ACT30, the control processor 114 stops the reading transmission. After that, the processing of the control processor 114 returns to ACT22. Then, the control processor 114 restarts reading transmission from the beginning and tries to perform new reading.

The reading operator instructs, after ending the reading of the RFID tag 200, to end the reading by the operation device 10 or the host computer 300.

In ACT25, the control processor 114 determines whether or not an instruction to end the reading has been input by the operation device 10 and whether or not the instruction has been provided from the host computer 300. Then, in the case where it is determined that an instruction to end the reading has been input by the operation device 10 or the instruction has been provided from the host computer 300 (YES in ACT25), the processing of the control processor 114 proceeds to ACT31. In ACT31, the control processor 114 stops the reading transmission. In ACT32, the control processor 114 instructs the machine learning processor 113 to end the decoding. Then, the control processor 114 ends the reading control processing. The machine learning processor 113 ends the operation in the decoding mode when the end of decoding has been instructed.

As described above, the tag reading apparatus 100 determines the tag data included in the data signal by machine learning. As a result, it is possible to increase the possibility that tag data can be correctly decoded even if the encoding speed varies in the wireless tag.

This embodiment can be modified in various ways as follows. The tag reading apparatus 100 may include a storage device storing the tag data table 302. The control processor 114 of the tag reading apparatus 100 may acquire the actual data by reading from the tag data table 302 of the storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tag reading apparatus that reads tag data from a wireless tag, comprising:

an antenna that emits a radio wave to start reading the tag data, receives a radio wave emitted from the wireless tag, and outputs a reception signal;

an extraction device that extracts, from the reception signal, a data signal in which the tag data has been encoded; and a processor configured to:

receive designation of a wireless tag to be learned, the tag data of the wireless tag to be learned including an identification code for identifying the wireless tag to be learned;

acquire the identification code of the wireless tag to be learned without receiving, by the antenna, a radio wave from the wireless tag to be learned, and generate, on a basis of the acquired tag data, correct answer data of the wireless tag to be learned;

cause the antenna to emit a radio wave for starting reading the identification code of the wireless tag to be learned to start reading the identification code of the wireless tag to be learned;

learn a feature amount of the data signal extracted by the extraction device from the reception signal output by the antenna that has received the radio wave from the wireless tag to be learned, in association with the correct answer data of the wireless tag to be learned, the feature amount indicating a fluctuation of a period of each bit of the data signal;

cause the antenna to emit a radio wave for starting reading tag data of a wireless tag to be read to start reading the tag data of the wireless tag to be read; and determine, on a basis of the feature amount, the tag data included in the data signal extracted by the extraction device from the reception signal output by the antenna that has received the radio wave from the wireless tag to be read.

2. The tag reading apparatus according to claim 1, further comprising:

an input device that inputs the identification code for identifying the wireless tag to be learned, wherein the processor receives, where the identification code has been input via the input device, designation of a wireless tag to be learned.

3. The tag reading apparatus according to claim 2, further comprising:

a storage device that stores, for each of identification codes of a plurality of wireless tags to be learned, unique data included in tag data of the wireless tag to be learned identified by the identification code in advance, wherein the processor acquires, from the storage device, the unique data of the designated wireless tag to be learned using the input identification code.

4. The tag reading apparatus according to claim 2, wherein the processor:

acquires data common to pieces of tag data of a plurality of wireless tags to be learned;

calculates checksum data for error detection regarding the acquired unique data; and adds the acquired common data and the calculated checksum data to the acquired unique data to generate the correct answer data.

5. The tag reading apparatus according to claim 3, wherein the storage device further stores data common to pieces of tag data of the plurality of wireless tags to be learned, and the processor:

acquires the common data from the storage device;

calculates checksum data for error detection regarding the acquired unique data; and adds the common data acquired from the storage device and the calculated checksum data to the acquired unique data to generate the correct answer data.

6. The tag reading apparatus according to claim 1, wherein the processor:

acquires, from an external storage device, unique data included in tag data of the wireless tag to be learned and data common to pieces of tag data of a plurality of wireless tags to be learned;

calculates checksum data for error detection regarding the acquired unique data; and adds the acquired common data and the calculated checksum data to the acquired unique data to generate the correct answer data.

7. The tag reading apparatus according to claim 1, wherein the processor learns a feature of a fluctuation of a 1-bit period in the data signal extracted by the extraction device.

8. The tag reading apparatus according to claim 4, wherein the processor:

acquires the tag data of the wireless tag to be read from the data signal extracted by the extraction device;

calculates checksum data for error detection regarding unique data included in the tag data of the wireless tag to be read; and compares the calculated checksum data of the tag data of the wireless tag to be read and the checksum data added to the correct answer data with each other to determine whether or not the tag data included in the data signal extracted by the extraction device has an error.

9. The tag reading apparatus according to claim 1, wherein the processor includes a control processor and a learning processor, where the learning is controlled, the control processor:

receives designation of a wireless tag to be learned, acquires tag data of the wireless tag to be learned without receiving, by the antenna, a radio wave from the wireless tag to be learned, and generates, on a basis of the acquired tag data, correct answer data of the wireless tag to be learned; and causes the antenna to emit a radio wave for starting reading the tag data of the wireless tag to be learned to start reading the tag data of the wireless tag to be learned, where reading of the wireless tag to be read is controlled, the control processor:

causes the antenna to emit a radio wave for starting reading tag data of a wireless tag to be read to start reading the tag data of the wireless tag to be read; and determines, on a basis of the feature amount, the tag data included in the data signal extracted by the extraction device from the reception signal output by the antenna that has received the radio wave from the wireless tag to be read, and the processor learns the data signal extracted by the extraction device from the reception signal output by the antenna that has received the radio wave from the wireless tag to be learned, in association with the correct answer data of the wireless tag to be learned.

10. A tag reading control method for a tag reading apparatus that reads tag data from a wireless tag, comprising:

receiving designation of a wireless tag to be learned; the tag data of the wireless tag to be learned including an identification code for identifying the wireless tag to be learned, acquiring the identification code of the wireless tag to be learned without receiving, by the antenna, a radio wave from the wireless tag to be learned;

generating, on a basis of the acquired tag data, correct answer data of the wireless tag to be learned;

causing the antenna to emit a radio wave for starting reading the identification code of the wireless tag to be learned to start reading the identification code of the wireless tag to be learned;

outputting a reception signal by the antenna that has received the radio wave emitted from the wireless tag;

extracting a data signal of the wireless tag to be learned from the reception signal output by the antenna that has received the radio wave from the wireless tag to be learned;

learning a feature amount of the extracted data signal in association with the correct answer data of the wireless tag to be learned, the feature amount indicating a fluctuation of a period of each bit of the extracted data signal;

causing the antenna to emit a radio wave for starting reading tag data of a wireless tag to be read to start reading the tag data of the wireless tag to be read;

extracting a data signal of the wireless tag to be read from the reception signal output by the antenna that has received the radio wave from the wireless tag to be read; and determining, on a basis of the feature amount, tag data of the wireless tag to be read included in the extracted data signal.

* * * * *